United States Patent
Movsesian (10) Patent No.: US 9,221,431 B2
(45) Date of Patent: Dec. 29, 2015

(54) WHEEL CLEANING MAT

(71) Applicant: Sami Movsesian, Glendale, CA (US)

(72) Inventor: Sami Movsesian, Glendale, CA (US)

( * ) Notice: Subject to any disclaimer, the term of this patent is extended or adjusted under 35 U.S.C. 154(b) by 0 days.

(21) Appl. No.: 14/264,680

(22) Filed: Apr. 29, 2014

(65) Prior Publication Data

US 2015/0307067 A1 Oct. 29, 2015

(51) Int. Cl.
  *B60S 3/04* (2006.01)
  *A47L 23/26* (2006.01)

(52) U.S. Cl.
  CPC .......... *B60S 3/042* (2013.01); *A47L 23/26* (2013.01); *A47L 23/266* (2013.01)

(58) Field of Classification Search
  CPC ........ A47L 23/22; A47L 23/26; A47L 23/266
  See application file for complete search history.

(56) References Cited

U.S. PATENT DOCUMENTS

| | | | | |
|---|---|---|---|---|
| 456,085 A | * | 7/1891 | Curtis | 15/112 |
| 1,935,517 A | * | 11/1933 | New | 15/217 |
| 2,056,058 A | * | 9/1936 | Tiedemann | 15/112 |
| 3,808,628 A | * | 5/1974 | Betts | 15/215 |
| 3,862,464 A | * | 1/1975 | Arens | 15/217 |
| 4,059,865 A | * | 11/1977 | Schmidt | 15/161 |
| 5,293,660 A | * | 3/1994 | Park | 15/160 |
| 5,486,392 A | * | 1/1996 | Green | 428/54 |
| 5,556,685 A | * | 9/1996 | Swicegood, Jr. | 428/95 |

FOREIGN PATENT DOCUMENTS

WO   WO 2009/092578 A2 *  7/2009

* cited by examiner

*Primary Examiner* — Randall Chin
(74) *Attorney, Agent, or Firm* — James A. Italia; Italia IP (57) ABSTRACT

A mat for clearing wheels and tires of contaminants as the wheels and tires roll over the mat. The mat includes a tray having a floor, a perimetric wall, and groups or clumps of bristles arranged to incline at an acute angle to the surface of the wheel, perpendicularly to the direction of travel of the wheel. Rows of bristles incline in generally opposing directions. The bristles are anchored to bristle supporting tracks which lie on the floor. Low walls surround and separate the clumps of bristles. The mat may be used as modules in an array. The array may include ramps configured to elevate the wheels above the floor of the tray. The array may include supports for holding the bristles above the tray for cleaning of the tray.

12 Claims, 5 Drawing Sheets

WHEEL CLEANING MAT

FIELD OF THE INVENTION

The present invention relates to a mat for cleaning wheels or tires of a vehicle, wherein the mat automatically scrubs the wheels or tires when the vehicle is rolled over the mat.

BACKGROUND OF THE INVENTION

Wheels of vehicles frequently pick up dirt and similar contaminants when in use. A vehicle may convey objectionable contaminants into a building or other premises merely when rolling along a floor or other horizontal surface.

SUMMARY OF THE INVENTION

Accordingly, a device which automatically scrubs wheels and tires of a vehicle as the vehicle rolls along a surface would find utility. The above stated need is satisfied by a mat having bristles configured to scrub contaminants from wheels or tires when the vehicle is driven or rolled over the mat. To this end, the mat includes at least one mat module having bristles inclined at acute angle to the supporting surface bearing the wheels of the vehicle. Bristles are provided in separated groups or clumps supported on a tray. Each group or clump is separated from another group or clump by short walls. The geometric relation of the inclined bristles automatically scrubs contaminants from wheels or tires when the vehicle is rolled over the mat. Contaminants removed from the wheel or tire are contained by the mat for subsequent disposal.

Individual mats may be arranged in an abutting array of mats. Opposed ends of the array may each be provided with ramps to facilitate passage of the vehicle over the mats.

Individual mats or the array of mats may be provided with supports having a base for standing erect on a flat surface, and fingers for engaging the mats. The supports are configured to hold individual mats erect above the tray, thereby exposing a floor of the tray so that removed contaminants may be collected from the tray for disposal. The supports also facilitate grasping and maneuvering the mats for purposes other than cleaning.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
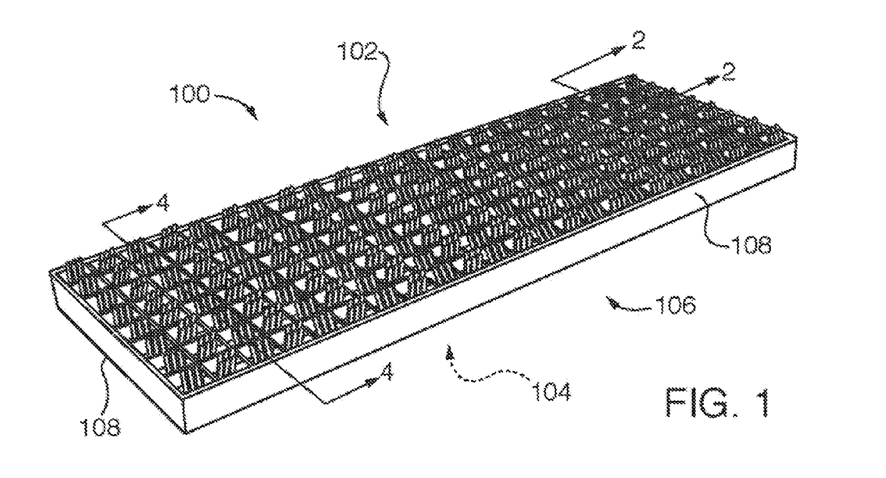
FIG. 1 is a perspective view of a wheel cleaning mat according to at least one aspect of the invention.
Figure 2:
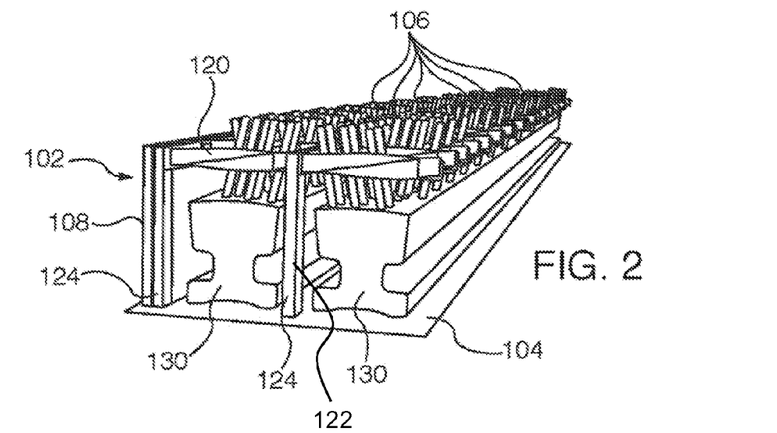
FIG. 2 is an enlarged perspective detail view taken along line 2-2 of FIG. 1.
Figure 3:
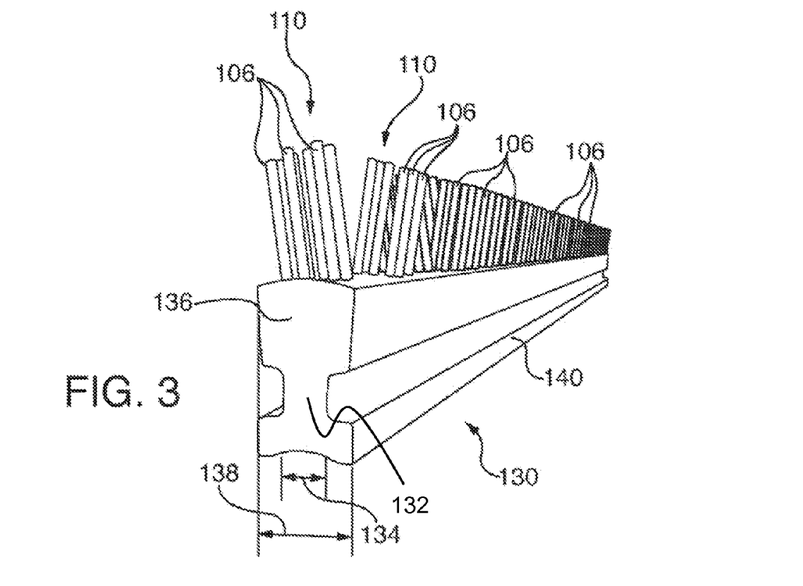
FIG. 3 is a perspective detail view of a component of FIG. 2, with surrounding structure removed to better reveal detail.
Figure 4:
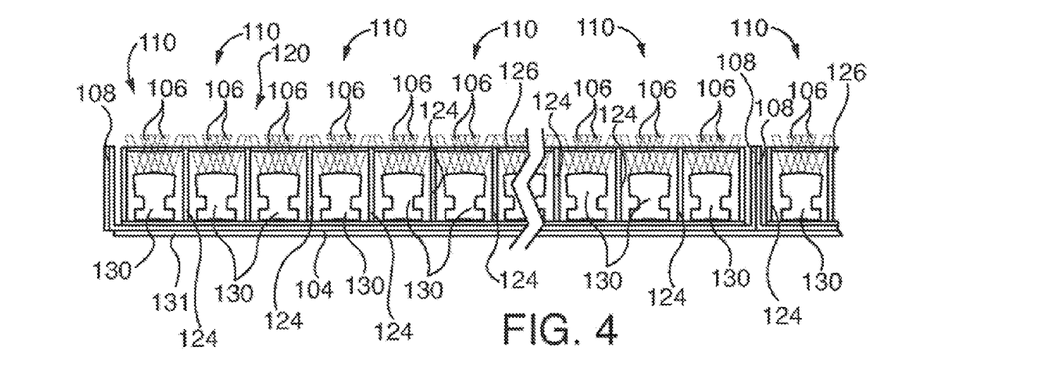
FIG. 4 is an enlarged detail end view taken along line 4-4 of FIG. 1.
Figure 5:
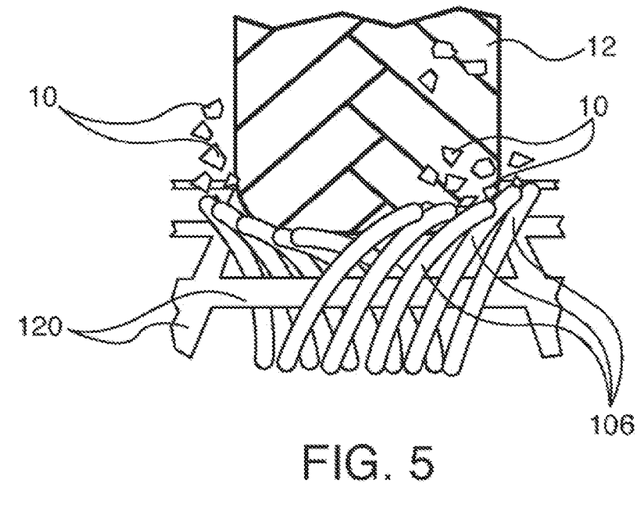
FIG. 5 is a diagrammatic environmental end view of a tire interacting with bristles of the wheel cleaning mat of FIG. 1, drawn to distorted scale.
Figure 6:
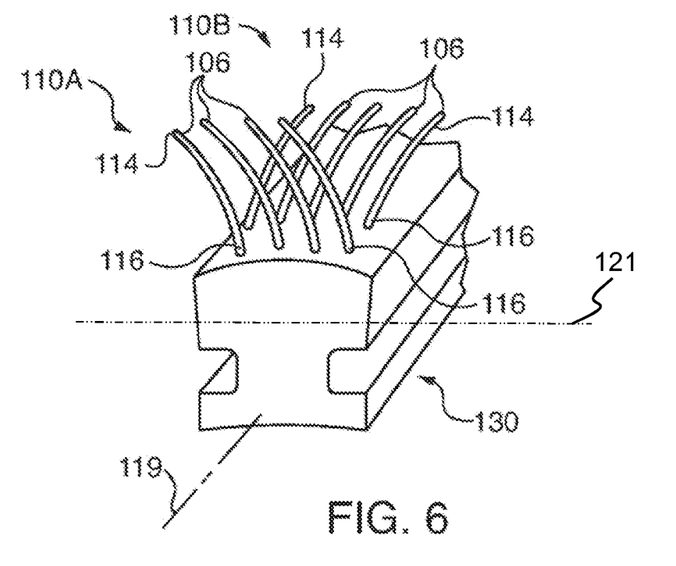
FIG. 6 is a perspective detail view of a component of the wheel cleaning mat of FIG. 1.

Referring first to FIG. 1, according to at least one aspect of the invention, there is shown a wheel cleaning mat 100 for automatically scrubbing wheels and tires of vehicles as the vehicles roll along a surface. The wheel cleaning mat 100 includes a tray 102 having an imperforate floor 104, a plurality of bristles 106 anchored to and projecting from the tray 102, and a perimetric wall 108 surrounding the plurality of bristles 106. Referring also to FIGS. 2-4, the bristles 106 are arranged in separated groups or clumps 110 of bristles 106, and are anchored along bristle supporting tracks 130 retained within the tray 102. The bristles 106 are inclined at an acute angle to the floor 104 of the tray 102. All of the bristles 106 of each one of the separated groups 110 of bristles 106 maybe inclined in the same direction. This is best seen in FIGS. 5 and 6. In FIG. 6, the bristles 106 of one clump 110A are inclined such that their upper ends 114 are farther to the left, as depicted in FIG. 6, than their lower ends 116. Conversely, the bristles 106 of another clump 110B are included such that their upper ends 114 are farther to the right, as depicted in FIG. 6, than their lower ends 116.

It should be noted at this point that orientational terms such as upper and lower refer to the subject drawing as viewed by an observer. The drawing figures depict their subject matter in orientations of normal use, which could obviously change with changes in position. Therefore, orientational terms must be understood to provide semantic basis for purposes of description only, and not imply that their subject matter can be used only in one position.

Figure 7:
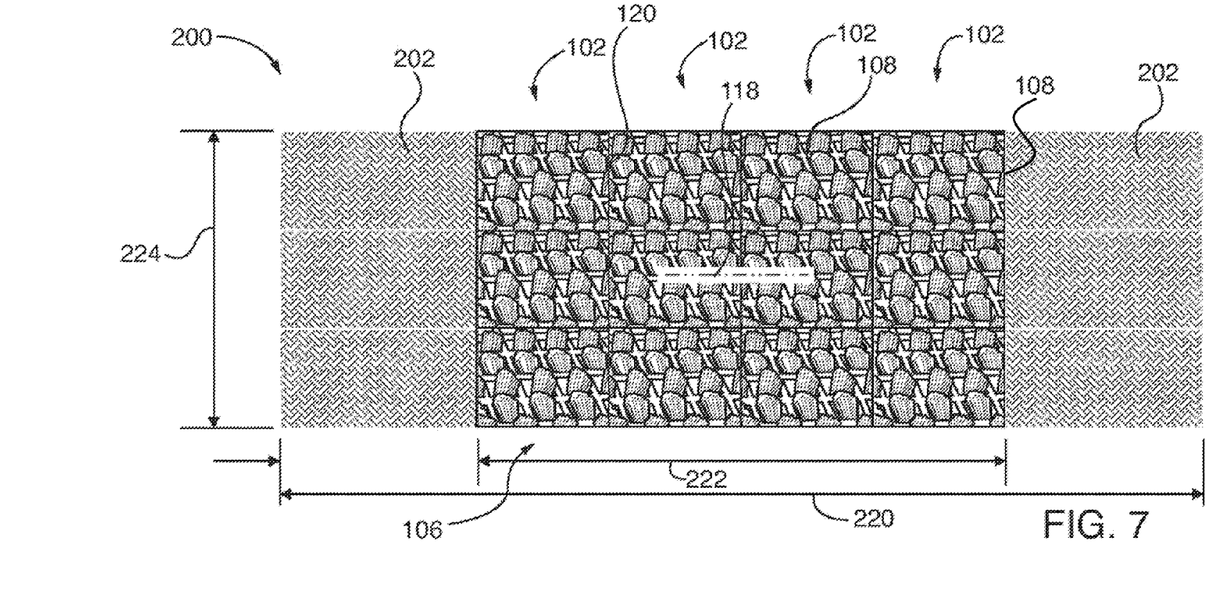
FIG. 7 is a top perspective view of an assembly including a plurality of wheel cleaning mats and associated ramps.

In FIG. 1, the tray 102 is rectangular as viewed in plan and has a longitudinal axis 118 (see FIG. 7). Each bristle 106 substantially occupies a hypothetical plane which is perpendicular to the floor 104 of the tray 102. Each plane occupied by one bristle 106 of one group 110 of bristles 106 is parallel to the planes occupied by every other bristle 106 of the same clump 110. In the depiction of FIG. 6, bristles 106 of any one clump 110 occupy a common plane, which common plane is perpendicular to the floor 102 of its associated tray 102, and also to the longitudinal axis 118. Inclination of the bristles 106, regardless of whether bristles 106 of any one clump 110 occupy the same plane, is oriented to remove dirt 10 and other contaminants from a tire 12 of a vehicle (not shown in its entirety). The selected inclination pushes removed dirt 10 to the right or to the left of the tire 12, when the tire rolls in a direction parallel to the longitudinal axis 118 seen in FIG. 7.

As depicted in FIG. 3 the bristles of any two adjacent groups of bristles 110 are oppositely inclined with respect to a hypothetical plane projecting perpendicularly from the tray 102 along the longitudinal axis 118.

Referring particularly to FIGS. 2, 4, 5, and 7, the wheel cleaning mat 100 also includes a grate 120 further including internal barriers 122 separating each group 110 of bristles 106 from every adjacent group 110 of bristles 106. The internal barriers 122 may comprise a frame including vertical walls 124 joined to horizontal rails 126, for example. The vertical walls 124 may project from the floor 104 of its associated tray 102 to the same height or extent as the perimetric wall 108 of the tray 102. The vertical walls 124 may be sufficiently sturdy to support the weight of a vehicle the wheels of which (such as that represented by the tire 12 in FIG. 5) are being cleaned by the wheel cleaning mat 100. This protects anchorage of the bristles 106 within the tray 102.

The bristles 106 are anchored to bristle supporting tracks 130 contained in the tray 102. Each group 110 of bristles 106 is anchored to one of the bristle supporting tracks 130. The bristle supporting tracks 130 may be bonded to the floor 104 of the tray 102 by a layer of adhesive 131 for example. Alternatively, the bristle supporting tracks 130 may be unattached to the tray 102, thereby being manually removable therefrom. As shown in FIG. 6, the bristle supporting tracks may have a longitudinal center line 119 which may be parallel to the longitudinal axis 118 (shown in FIG. 7) of the tray 102, when the bristle supporting tracks are bonded or removeably placed in the tray 102. As seen in FIG. 6, the bristles 106 may be arranged on the bristle supporting tracks 130 in rows oriented perpendicularly to the longitudinal centerline 119, and parallel to a lateral axis 121, the lateral axis 121 perpendicular to the centerline 119; and columns oriented parallel to the longitudinal centerline 119.

Referring particularly to FIGS. 2, 3, and 4, each bristle supporting track 130 is flexible, being fabricated from a flexible elastomeric material for example. Each bristle supporting track may include a stem 132 having a width 134 and an enlarged head 136 having a width 138 greater than that of the stem 132 (see particularly FIG. 3). As used herein, the width 134 of the stem 132 and the width 138 of the enlarged head 136 are each parallel to the floor 104 of the tray 102, and perpendicular to the longitudinal direction of the respective bristle supporting track 130. In the depiction of FIG. 7, the longitudinal direction of the bristle supporting tracks 130 is parallel to the longitudinal axis 118 of each tray 102.

Again referring particularly to FIG. 3, each bristle supporting track 130 includes a base 140 having a width greater than that of the stem 132. In the depiction of FIG. 3, the width 138 of the enlarged head 136 is identical to the width of the base 140, although this relationship is not critical.

Referring particularly to FIG. 4, the bristles 106 project from the bristle supporting tracks 130 upwardly as depicted beyond the perimetric wall 108 of the tray 102. The bristle supporting tracks 130 are recessed below the perimetric wall 108 of the tray 102. This arrangement enables the ends of the bristles 106 to engage and scrub the tires (such as the tire 12 of FIG. 5) of passing vehicles. The vertical walls 124 of the grate 120 described above prevent the weight of passing vehicles from permanently deforming or otherwise damaging the bristle supporting tracks 130, where the vertical walls 124 are sufficiently sturdy to support the weight of the passing vehicle, thereby achieving the fore mentioned protection of the anchorage of the bristles 106 within the tray 102.

Figure 8:
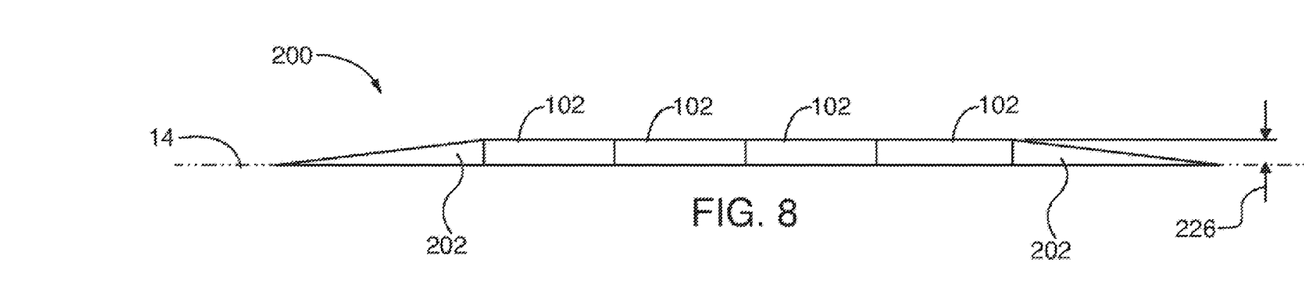
FIG. 8 is a side view of FIG. 7.

As seen in FIGS. 7 and 8, the invention may be practiced in the form of a wheel cleaning mat system 200. The wheel cleaning mat system 200 may include a plurality of mat modules, wherein each mat module comprises a tray 102 described above, and at least one ramp 202 configured to enable a wheel to roll onto the mat modules from a floor surface 14 when the mat modules lie on the floor surface 14. In FIGS. 7 and 8, two mirror image ramps 202 are provided to facilitate rolling of wheels onto and off the mat modules from either of two opposed directions.

Figure 9:
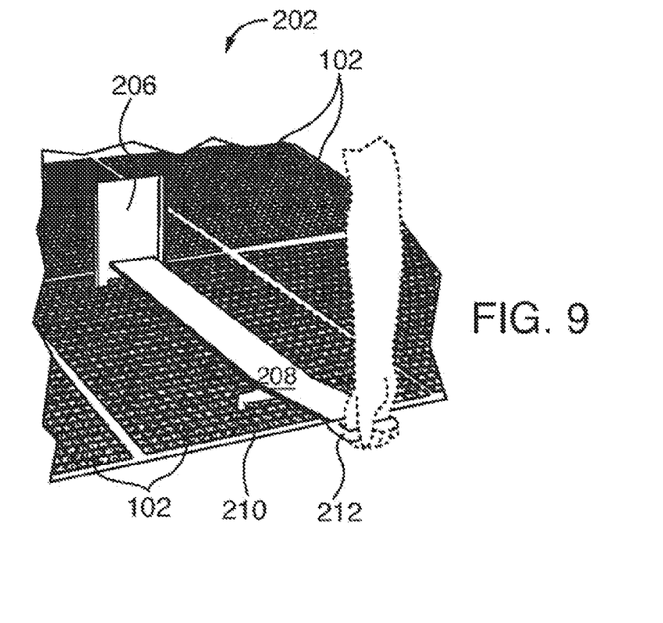
FIG. 9 is an environmental perspective view of a support functional to raise and hold in a raised position the wheel cleaning mat of FIG. 1.
Figure 10:
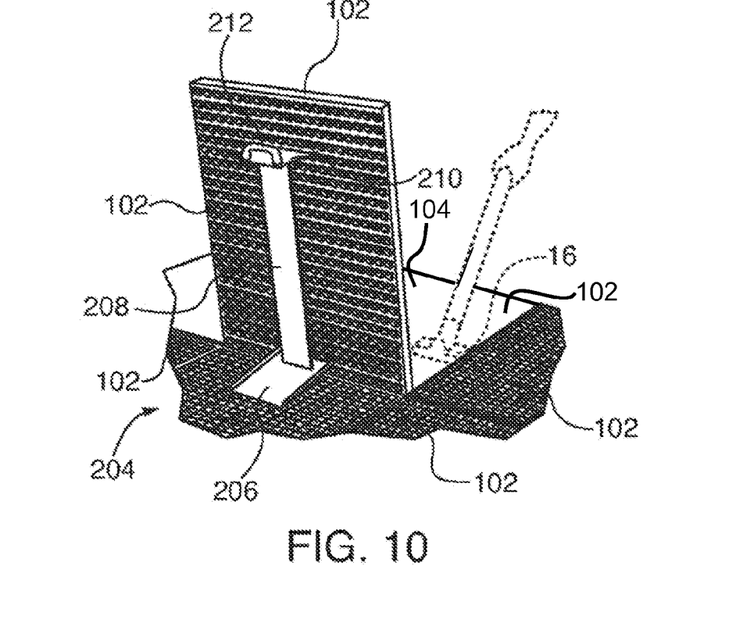
FIG. 10 is an environmental perspective view of a wheel cleaning mat being held in a raised position by the support of FIG. 9.

Turning now to FIGS. 9 and 10, the wheel cleaning mat system 200 may further include a support 204 for holding one of the mat modules erect, thereby exposing the floor 104 of the tray 102 of the erect module for cleaning. Cleaning may be performed with a standard industrial capacity vacuum cleaner 16, for example. FIG. 9 shows initial engagement of a mat module or tray 102, using the support 204. FIG. 10 shows the mat module supported in the erect position.

The support 204 includes a base 206, an arm 208 projecting generally perpendicularly from the base 206, and at least one finger 210 projecting from the arm 208. The finger 210 is hooked or otherwise configured to engage the module and hold the module erect. The finger 210 could engage the horizontal rail 126 of the grate 120 (see FIG. 4), for example. The support 204 may include hand grip 212 configured to enable a person to grip the support 204 for carrying and maneuvering the support 204.

Dimensions of an illustrative cleaning mat system 200 are shown in FIG. 7. The overall length 220 of the cleaning mat system 200 may be about two hundred thirty-three inches. Length 222 of the active cleaning portion, which as depicted includes an array four trays 102 in length and three trays 102 in width, may be about one hundred fifty-four inches. Each ramp 202 may be about thirty-nine inches in the direction of the length 220, and as wide as the width 224 of the array of the trays 102. The width 222 may be about eighty-three inches.

As seen in FIG. 8, the height 226 of the ramps 202 and the array of trays 102 may be one and one half to two inches above the floor surface 14.

The longer the active cleaning portion, the more dirt is removed from wheels and tires. For facilities employing ordinary automobiles, trucks, and other conventional wheeled equipment such as fork lifts, garden tractors, small bulldozers, and other equipment typically staffed by one person, the active cleaning portion should contact each wheel for three to four full wheel rotations, to remove ordinary dirt, for example. The width 224 should be selected to accommodate the full width, taken at the wheels or tires, of the largest vehicle to be serviced at the facility.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:
1. A wheel cleaning mat, comprising:
a tray having an imperforate tray floor;
a plurality of bristle supporting tracks removeably arranged on the tray floor;
a plurality of groups of bristles anchored to and projecting from each bristle supporting track;
a grate including internal barriers, the grate configured to be removeably placed on the tray, such that the internal barriers separate each group of bristles from other groups of bristles; and
a perimetric wall surrounding the plurality of groups of bristles; and
wherein the groups of bristles are inclined at an acute angle to the floor of the tray, and all of the bristles of each one of the groups of bristles are inclined in the same direction.

2. The wheel cleaning mat of claim 1, wherein the tray is rectangular as viewed in plan and has a tray longitudinal axis, each bristle substantially occupies a hypothetical plane which is perpendicular to the floor of the tray, and each plane occupied by one bristle of one group of bristles is parallel to the planes occupied by every other bristle of the same group.

3. The wheel cleaning mat of claim 1, wherein the bristles of any two adjacent groups of bristles are oppositely inclined with respect to a hypothetical plane projecting perpendicularly from the tray along the longitudinal axis.

4. The wheel cleaning mat of claim 1, wherein the internal barriers project from the floor of the tray to the same extent as the perimetric wall.

5. The wheel cleaning mat of claim 1, wherein:
   each bristle supporting track includes a track longitudinal centerline and a track lateral axis perpendicular to the longitudinal centerline;
   the tray includes a tray longitudinal axis;
   each track longitudinal centerline is parallel to the tray longitudinal axis; and
   the groups of bristles are arranged on the bristle supporting tracks such that the bristles are in rows oriented parallel to the track lateral axis and columns oriented parallel to the track longitudinal centerline.

6. The wheel cleaning mat of claim 1, wherein each bristle supporting track is flexible, and has a stem having a stem width and an enlarged head having a head width, the head width greater than the stem width, where the stem width and the head width are parallel to the floor and perpendicular to the longitudinal direction of the respective bristle supporting track.

7. The wheel cleaning mat of claim 1, wherein each bristle supporting track has a stem having a stem width, and a base having a base width, the base width greater than the stem width, where the stem width and the base width are parallel to the floor and perpendicular to the longitudinal direction of the respective bristle supporting track.

8. The wheel cleaning mat of claim 1, wherein the bristles project from at least one of the bristle supporting tracks beyond the perimetric wall of the tray, and the least one of the bristle supporting tracks is recessed below the perimetric wall of the tray.

9. A wheel cleaning mat system which automatically brushes contaminant from a wheel rolling over the wheel cleaning mat system, comprising a plurality of mat modules, wherein each mat module comprises:
   a tray having an imperforate tray floor;
   a plurality of bristle supporting tracks removeably arranged on floor;
   a plurality of groups of bristles anchored to and projecting from the tray each bristle supporting track;
   a grate including internal barriers, the grate configured to be removeably placed on the tray, such that the internal barriers separate each group of bristles from other groups of bristles; and
   a perimetric wall surrounding the plurality of groups of bristles; and
   wherein the bristles are arranged in separated groups of bristles, the groups of bristles are inclined at an acute angle to the floor of the tray, and all of the bristles of each one of the groups of bristles are inclined in the same direction.

10. The wheel cleaning mat system of claim 9, further comprising at least one ramp configured to enable a wheel to roll onto the mat modules from a floor surface when the mat modules lie on the floor surface.

11. The wheel cleaning mat system of claim 9, further comprising a support for holding one of the modules erect, thereby exposing the floor of the tray of the erect module for cleaning, the support including a base;
   an arm projecting generally perpendicularly from the base; and
   at least one finger projecting for the arm, wherein the finger is configured to engage the module and hold the module erect.

12. The wheel cleaning mat system of claim 11, wherein the support includes a hand grip configured to enable a person to grip the support for carrying and maneuvering the support.

* * * * *

US009221431C1

(12) EX PARTE REEXAMINATION CERTIFICATE (11608th)
United States Patent
Movsesian (10) Number: US 9,221,431 C1
(45) Certificate Issued: Dec. 3, 2019

(54) WHEEL CLEANING MAT (71) Applicant: Sami Movsesian, Glendale, CA (US)

(72) Inventor: Sami Movsesian, Glendale, CA (US)

Reexamination Request:
No. 90/014,244, Dec. 17, 2018

Reexamination Certificate for:
Patent No.: 9,221,431
Issued: Dec. 29, 2015
Appl. No.: 14/264,680
Filed: Apr. 29, 2014

(51) Int. Cl.
*B60S 3/04* (2006.01)
*A47L 23/26* (2006.01)

(52) U.S. Cl.
CPC ............... *B60S 3/042* (2013.01); *A47L 23/26* (2013.01); *A47L 23/266* (2013.01)

(58) Field of Classification Search
None
See application file for complete search history.

(56) References Cited

To view the complete listing of prior art documents cited during the proceeding for Reexamination Control Number 90/014,244, please refer to the USPTO's public Patent Application Information Retrieval (PAIR) system under the Display References tab.

*Primary Examiner* — Patricia L Engle (57) ABSTRACT

A mat for clearing wheels and tires of contaminants as the wheels and tires roll over the mat. The mat includes a tray having a floor, a perimetric wall, and groups or clumps of bristles arranged to incline at an acute angle to the surface of the wheel, perpendicularly to the direction of travel of the wheel. Rows of bristles incline in generally opposing directions. The bristles are anchored to bristle supporting tracks which lie on the floor. Low walls surround and separate the clumps of bristles. The mat may be used as modules in an array. The array may include ramps configured to elevate the wheels above the floor of the tray. The array may include supports for holding the bristles above the tray for cleaning of the tray.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-12 are cancelled.

\* \* \* \* \*